United States Patent
Sakurai et al.

(10) Patent No.: US 6,696,541 B1
(45) Date of Patent: Feb. 24, 2004

(54) METHOD FOR CRYSTALLIZATION OF LOW MOLECULAR WEIGHT POLYCARBONATE AND METHOD FOR PREPARING POLYCARBONATE RESIN FROM IT

(75) Inventors: Tomonori Sakurai, Kyoto (JP); Nobuaki Kido, Yamaguchi (JP); Shunichi Matsumura, Yamaguchi (JP); Toyoaki Ishiwata, Yamaguchi (JP); Kazuteru Kohno, Yamaguchi (JP); Hirotaka Suzuki, Yamaguchi (JP); Hironori Haga, Yamaguchi (JP); Toru Hikosaka, Yamaguchi (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/088,590

(22) PCT Filed: Sep. 21, 2000

(86) PCT No.: PCT/JP00/06470

§ 371 (c)(1),
(2), (4) Date: Mar. 21, 2002

(87) PCT Pub. No.: WO01/21681

PCT Pub. Date: Mar. 29, 2001

(30) Foreign Application Priority Data

Sep. 22, 1999 (JP) .......................... 11-268380
Sep. 27, 1999 (JP) .......................... 11-272000
Mar. 6, 2000 (JP) .......................... 2000-060314

(51) Int. Cl.⁷ .............................. C08G 64/00
(52) U.S. Cl. .................. 528/196; 359/642; 428/64; 528/198
(58) Field of Search .............. 359/642; 428/64; 528/196, 198

(56) References Cited

U.S. PATENT DOCUMENTS

| | | | |
|---|---|---|---|
| 5,717,056 A | 2/1998 | Varadarajan et al. | |
| 5,864,006 A | 1/1999 | Ormand et al. | |

FOREIGN PATENT DOCUMENTS

| | | | |
|---|---|---|---|
| EP | 1245607 | * | 9/2000 |
| JP | 64-4617 | | 1/1989 |
| JP | 64-004617 | | 1/1989 |
| JP | 01-158033 | | 6/1989 |
| JP | 06-271659 | | 9/1994 |
| JP | 6-271659 | | 9/1994 |
| JP | 2002/542216 | * | 11/2000 |
| JP | 02001011171 | * | 1/2001 |

* cited by examiner

Primary Examiner—Terressa Boykin
(74) Attorney, Agent, or Firm—Sughrue Mion, PLLC

(57) ABSTRACT

A method for crystallizing a low molecular weight aromatic polycarbonate effectively and a method for preparing a polycarbonate resin having a desired intrinsic viscosity by using the polycarbonate crystallized with the above method of crystallization.

A low molecular weight aromatic polycarbonate (preferably, the one produced by melt polycondensation) is crystallized by bringing it into contact with an aromatic monohydroxy compound or a mixture of said compound and water. Or, a low molecular weight aromatic polycarbonate is melt mixed with at least one or more kinds of compounds selected from the group consisting of aromatic monohydroxy compounds, carbonic acid diester compounds and aromatic dihydroxy compounds to crystallize the low molecular weight aromatic polycarbonate. The crystallized product is heated at a temperature lower than its melting point under reduced pressure or in an inert gas flow to convert it into a high polymerized state. Thus, a polycarbonate resin having a desired intrinsic viscosity is prepared.

13 Claims, No Drawings

METHOD FOR CRYSTALLIZATION OF LOW MOLECULAR WEIGHT POLYCARBONATE AND METHOD FOR PREPARING POLYCARBONATE RESIN FROM IT

TECHNICAL FIELD

The present invention relates to crystallization of a low molecular weight polycarbonate and a method for preparing a polycarbonate resin by using the crystallization method. More specifically, the present invention relates to the method of crystallization, in which the engineering design of a recovery process is simple and short time crystallization is easy, and a method for preparing a high molecular weight polycarbonate resin having excellent color tone and accompanying less gel component, in high productivity by using the crystallization method.

BACKGROUND ART

Aromatic polycarbonate resins are currently used in optical uses such as CDs (compact discs), optical discs or lenses as a material excellent in transparency, heat resistance and mechanical properties, and they are used in various fields such as automobile fields, electrical and electronic applications or various containers as an engineering plastic.

Such aromatic polycarbonate resins conventionally have been produced by interfacial polymerization in which phosgene and an aromatic dihydroxy compound are polymerized in water and a water-immiscible solvent, melt polycondensation in which an aromatic dihydroxy compound and a carbonate bond-forming compound are subjected to la heat melt reaction in the presence of an ester interchange catalyst, or the like.

On the other hand, a method in which a low molecular weight aromatic polycarbonate (this is sometimes called "an oligomer" or "a prepolymer") is crystallized, and then it is polymerized in a solid phase for preparing a high molecular weight polycarbonate resin is well known. Regarding the solid phase polymerization method, for example, JP-B 7-094546 (JP-B means Japanese examined patent publication) discloses the ratio of terminal groups and the method of crystallization of a low molecular weight polycarbonate, the degree of crystallization after crystallization of the oligomer, and others. Regarding the method for crystallization of the oligomer, the patent publication describes a heat crystallization method and a solvent treating method. The heat crystallization method shown in the publication comprises heating and holding the oligomer at a temperature equal to or higher than the glass transition temperature (Tg) of the oligomer and lower than the temperature at which the oligomer starts to melt. Further, regarding the solvent treating method, a method comprising dissolving the oligomer in a solvent followed by precipitation and crystallization, and a method comprising dipping the oligomer in a solvent having a smaller solubility against the oligomer, for example, acetone, ethyl acetate, tetrahydrofuran or the like, are shown.

However, under the present conditions the methods for crystallizing a low molecular aromatic polycarbonate have jet some troubles on industrial applications. That is, the heating crystallization comprises the simple holding of the oligomer at a constant temperature, but it has troubles that it needs the heating and holding for about 1 hour for crystallization even in the shortest case and is low in productivity. The solvent crystallization method can shorten the time required for crystallization in a considerable degree compared with the heating crystallization method, but the scale of apparatus becomes larger since the method separately requires a recovery process for the solvent used for crystallization, and further the method commonly has a trouble that the polycarbonate to be obtained is brittle and apt to become fine particles since the solvent used for crystallization commonly, at the same time, causes cracks frequently on the polycarbonate.

On the other hand, for reducing the dissolution of a low molecular weight polycarbonate into a crystallization solvent, a method in which the polycarbonate is crystallized in a mixture of a solvent and a diluent is proposed (U.S. Pat. No. 5,864,006). This method certainly can reduce the dissolution of the polymer into the solvent; however, sine the crystallization is too slow, particles are apt to fuse to each other before they crystallize, and the method has a new trouble of needing a large volume of solvent for preventing the fusion.

DISCLOSURE OF THE INVENTION

It is an object of the present invention to solve the above-mentioned troubles accompanied by the conventional methods and to provide a method for effectively crystallizing a low molecular weight aromatic polycarbonate of an uncrystallized state and a method for effectively producing a polycarbonate resin using the crystallization method.

The inventors of the present invention zealously pursued studies to achieve the above-mentioned tasks and found the following: the crystallization of an uncrystallized low molecular weight aromatic polycarbonate can be effectively achieved by bringing the polycarbonate into contact with a specific compound which conventionally has been considered unsuitable as a crystallization solvent since it is a good solvent, without accompanying troubles which the conventional methods accompany and further, the recovery of the solvent in this process is easy; and a polycarbonate resin of high quality which has excellent color tone and less branching can be produced by subjecting the low molecular weight aromatic polycarbonate crystallized by the crystallization method to a solid phase polymerization. Thus, they have completed the present invention.

That is, the first invention of the present invention is a method for crystallizing a low molecular weight aromatic polycarbonate characterized in that an uncrystallized low molecular weight aromatic polycarbonate whose main recurrent unit is expressed by the following formula (1),

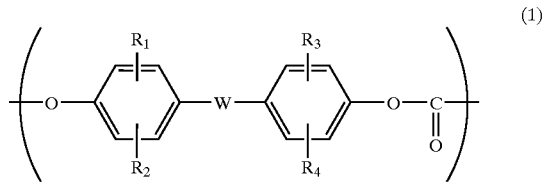

[in the formula (1), $R_1$, $R_2$, $R_3$ and $R_4$ are each independently a hydrogen atom, a halogen atom, a $C_{1-10}$ alkyl group, a $C_{7-20}$ aralkyl group or a $C_{6-20}$ aryl group; W is a $C_{2-10}$ alkylidene group, a $C_{1-15}$ alkylene group, a $C_{7-20}$ aryl-substituted alkylene group, a $C_{3-15}$ cycloalkylidene group, a $C_{3-15}$ cycloalkylene group, an oxygen atom, a sulfur atom, a sulfoxide group or a sulfone group], and which has an intrinsic viscosity [η] of 0.05 to 0.38 is crystallized by bringing it into contact with a monohydroxy compound or a mixture of said compound and water.

The second invention of the present invention is a method for crystallizing a low molecular weight aromatic polycarbonate characterized in that 100 parts by weight of an uncrystallized low molecular weight aromatic polycarbonate whose main recurrent unit is expressed by the above formula (1), and having an intrinsic viscosity [η] of 0.05 to 0.38 and 0.1 to 25 parts by weight of an aromatic monohydroxy compound are subjected to melt mixing, and the obtained mixture is held at a temperature equal to or higher than the glass transition temperature and lower than the melting point of the mixture for crystallizing the low molecular weight aromatic polycarbonate.

The third invention is a method for preparing a high quality polycarbonate resin by heating the low molecular weight aromatic polycarbonate, which has been crystallized by the above method, at a temperature equal to or lower than the melting point of the crystallized product under reduced pressure or in an inert gas flow to convert it into a high polymerization state.

Hereafter the method of the present invention is explained in detail.

"Aromatic polycarbonate" of the present invention is a thermoplastic polymer whose main polymeric recurrent unit is expressed by the above-mentioned formula (1).

The aromatic polycarbonate is a thermoplastic polymer commonly produced by the reaction of an aromatic dihydroxy compound with a carbonate bond-forming compound, and as the aromatic dihydroxy compound used in the production of the polymer, a compound expressed by the following formula (2) is preferably used, and in the formula (2), $R_1$, $R_2$, $R_3$ and $R_4$, and W are same as those in the above formula (1).

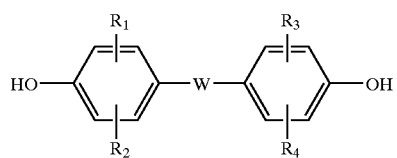

(2)

Here, in $R_1$, $R_2$, $R_3$ and $R_4$, the $C_{1-10}$ alkyl group is, for example, methyl, ethyl, propyl, t-butyl or the like; the $C_{7-20}$ aralkyl group is, for example, benzyl, 2-phenyl-2-propyl or the like. Further, the $C_{6-20}$ aryl group is, for example, phenyl, α-naphthyl, β-naphthyl or the like. Further, all or a part of $R_1$, $R_2$, $R_3$ and $R_4$ may be a hydrogen atom or a halogen atom.

On the other hand, the W is a $C_{2-10}$ alkylidene group, a $C_{1-15}$ alkylene group, a $C_{7-20}$ aryl-substituted alkylene group, a $C_{3-15}$ cycloalkylidene group or a $C_{3-15}$ cycloalkylene group. The alkylidene group is, for example, methylene, ethylidene, 2,2-propylidene, 2,2-butylidene or the like. The alkylene group is, for example, 1,2-ethylene, 1,3-propylene or the like. The cycloalkylidene group is, for example, 1,1-cyclopentyl, 1,1-cyclohexyl, 9,9-fluorene or the like.

Concrete examples of the aromatic dihydroxy compound include bis(4-hydroxyaryl)alkanes such as bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)phenylmethane, 4,4'-dihydroxyphenyl-1,1'-m-diisopropylbenzene, and 4,4'-dihydroxyphenyl-9,9-fluorene, bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,3,5-trimethylcyclohexane, 1-methyl-1(4-hydroxyphenyl)-4-(dimethyl-4-hydroxyphenyl)methylcyclohexane, 4-{1-[3-(4-hydroxyphenyl)-4-methylcyclohexyl]-1-methylethyl}-phenol, 4,4'-[1-methyl-4-(1-methylethyl)-1,3-cyclohexanediyl]bisphenol, 9,9-bis(4-hydroxy-3-methylphenyl)fluorene and 2,2,2',2'-tetrahydro-3,3,3',3'-tetramethyl1,1'-spirobis-[1H-indene]6,6'-diol; dihydroxyaryl ethers such as bis(4-hydroxyphenyl) ether, bis(4-hydroxy-3,5-dichlorophenyl) ether and 4,4'-dihydroxy-3,3'-dimethylphenyl ether, dihydroxydiaryl sulfides such as 4,4'-dihydroxydiphenyl sulfide and 4,4'-dihydroxy-3,3'-dimethyldiphenyl sulfide, dihydroxydiaryl sulfoxides such as 4,4'-dihydroxydiphenyl sulfoxide and 4,4'-dihydroxy-3,3'-dimethyldiphenyl sulfoxide, dihydroxydiaryl sulfones such as 4,4'-dihydroxydiphenyl sulfone and 4,4'-dihydroxy-3,3'-dimethyldiphenyl sulfone, dihydroxydiarylisatins such as 4,4'-dihydroxydiphenyl-3,3'-isatin, dihydroxydiarylxanthenes such as 3,6-dihydroxy-9,9-dimethylxanthene, dihydroxybenzenes such as resorcin, 3-methylresorcin, 3-ethylresorcin, 3-butylresorcin, 3-t-butylresorcin, 3-phenylresorcin, 3-cumylresorcin, hydroquinone, 2-methylhydroquinone, 2-ethylhydroquinone, 2-butylhydroquinone, 2-t-butylhydioquinone, 2-phenylhydroquinone and 2-cumylhydroquinone, dihydroxydiphenyls such as 4,4'-dihydroxydiphenyl and 3,3'-dichloro-4,4'-dihydroxydiphenyl, and the like. These compounds may be used independently or in combination of two or more kinds.

Among them, 2,2-bis(4-hydroxyphenyl)propane (common name is "bisphenol A") is cited as an especially suitable aromatic dihydroxy compound to use in the method of the present invention from the points that it is stable as a monomer and easily available in a state in which the quantity of impurities is little, and others.

Needless to say, with the objects of controlling the glass transition temperature, improving the fluidity, increasing the refractive index, improving crystallinity, and controlling optical properties, for example, decreasing the birefringence or the like, various kinds of monomers can be compounded (copolymerized) independently or in combination of two or more kinds at need besides the above-mentioned aromatic dihydroxy compounds into the aromatic polycarbonate of the present invention.

Concrete examples of the copolymerizing components include (i) aliphatic dihydroxy compounds, for example, ethylene glycol, 1,4-butanediol, 1,4-cyclohexanedimethanol, 2,2-dimethyl-1,3-propanediol, 1,10-decanediol, diethylene glycol tetraethylene glycol, polyethylene glycol, polytetramethylene glycol and the like, (ii) dicarboxylic acids, for example, succinic acid, isophthalic acid, 2,6-naphthalenedicarboxylic acid, adipic acid, cyclohexanedicarboxylic acid, terephthalic acid and the like; and (iii) oxy acids, for example, p-hydroxybenzoic acid, 6-hydroxy-2-naphthoic acid, lactic acid and the like.

On the other hand, as the carbonate bond-forming compound, an aromatic carbonic acid ester is used when the polycarbonate oligomer is produced by a melt polycondensation method.

Concrete examples of the aromatic carbonic acid ester include diaryl carbonates such as diphenyl carbonate, ditolyl carbonate, bis(2-chlorophenyl) carbonate, m-cresyl carbonate, dinaphthyl carbonate and bis(4-phenylphenyl) carbonate, dialkyl carbonates of dimethyl carbonate, diethyl carbonate and dibutyl carbonate, and dicycloalkyl carbonates such as dicyclohexyl carbonate. Among them, diphenyl carbonate is the most preferred from the points of reactivity, stability against coloring of the obtained resin, and further cost.

Further, as the carbonate bond-forming compound, commonly phosgene is used when the polycarbonate oligomer is produced by an interfacial polymerization method.

The low molecular weight aromatic polycarbonate to which the present invention is applied is produced preferably through melt polycondensation which subjects the above-mentioned aromatic dihydroxy compound and the carbonate bond-forming compound to melt polycondensation which is carried out by heat melt reaction preferably in the presence of an ester interchange catalyst. In this case, the charging mole ratio of the row materials for polymerization, although it somewhat depends on the type, the size or the like of the polymerization reactor, is about 1.07/1 to 0.9/1 in the mole ratio of carbonate bond-forming compound/ aromatic dihydroxy compound.

In the production of an aromatic polycarbonate, especially a low molecular weight aromatic polycarbonate (an oligomer or prepolymer) by melt polycondensation, an ester interchange catalyst is applicable. The ester interchange catalyst is a catalyst system containing an alkali metal compound, a titanium catalyst such as tetrabutyl titanate, a tine compound such as stannous acetate or dibutyltin diacetate, a germanium compound such as germanium oxide, an alkaline earth metal compound such as calcium acetate, or the like. Among them, a basic ester interchange catalyst is preferred from the points of view of a polymerization reaction speed, coloring during the reaction and the like, and a catalyst system containing an alkali metal compound is especially preferred.

Examples of the alkali metal compound preferably used as the above-mentioned catalyst include hydroxides, hydrogencarbonates, carbonates, acetates, nitrates, nitrites, sulfites, cyanates, thiocyanatess, stearates, borohydrides, benzoates, hydrogenphosphates, bisphenol salts and phenol salts of an alkali metal.

Concrete examples of the compounds include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, cesium carbonate, sodium acetate, potassium acetate, lithium acetate, sodium nitrate, potassium nitrate, rubidium nitrate, lithium nitrate, sodium nitrite, potassium nitrite, rubidium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, cesium thiocyanate, sodium stearate, potassium stearate, lithium stearate, cesium stearate, sodium borohydride, potassium borohydride, lithium borohydride, sodium phenyl borate, sodium benzoate, potassium benzoate, lithium benwate, disodium hydrogenphosphate, dipotassium hydrogenphosphate and dilithium hydrogenphosphate; disodium salt, dipotassium salt, dilithium salt, monosodium salt, monopotassium salt, sodium potassium salt and sodium lithium salt of bisphenol A; sodium salt, potassium salt and lithium salt of phenol and the like.

As the catalyst of melt polymerization reaction, a catalyst system containing an alkali metal element as shown above can be used; however, since the alkali metal compound has an activity to decompose a carbonate bonding, the amount of its use is preferably suppressed as low as possible while keeping the speed of polymerization reaction.

In order to achieve the object, it is preferable to use a basic nitrogen compound and/or a basic phosphorus compound together with a basic ester interchange catalyst such as the above-mentioned alkali metal compound and keep the amount of an alkali metal element in the range of $1\times10^{-8}$ to $5\times10^{-5}$ mol based on 1 mol of the aromatic dihydroxy compound. When the amount deviates from the range, the process has adverse influences on the properties of the obtained aromatic polycarbonate, or the ester interchange reaction does not proceed well, and in some cases, a polymer having a high molecular weight is not obtained. By using the alkali metal element originated from the catalyst in the above-mentioned amount range in the polycarbonate, the polycarbonate can be effectively produced, and at the same time the physical properties of the obtained polycarbonate are preferable for achieving the objects of the present invention.

Concrete examples of the basic nitrogen compound used as a catalyst together with the basic ester interchange catalyst here include (a) ammonium hydroxides having alkyl groups, aryl groups, alkyl and aryl groups, or the like such as tetramethylammonium hydroxide ($Me_4NOH$), tetraethylammonium hydroxide ($Et_4NOH$), tetrabutylammonium hydroxide ($Bu_4NOH$), benzyltrimethylammonium hydroxide ($Ph\text{-}CH_2(Me)_3NOH$) and hexadecyltrimethylammonium hydroxide, (b) basic ammonium salts having alkyl groups, aryl groups, alkyl and aryl groups, or the like such as tetramethylammonium acetate, tetraethylammonium phenoxide, tetrabutylammonium carbonate, benzyltrimethylammonium benzoate and hexadecyltrimethylammonium ethoxide, (c) tertiary amines such as triethylamine, tributylamine, dimethylbenzylamine and hexadecyldimethylamine, (d) basic salts such as tetramethylammonium borohydride ($Me_4NBH_4$), tetrabutylammonium borohydride ($Bu_4NBH_4$), tetrabutylammonium tetraphenyl borate ($Bu_4NBPh_4$) and tetramethylammonium tetraphenyl borate ($Me_4NBPh_4$), and the like.

Further, concrete examples of the basic phosphorus compound to use in combination as a catalyst include 1̂ phosphonium hydroxides having alkyl groups, aryl groups, alkyl and aryl groups, or the like such as tetramethylphosphonium hydroxide ($Me_4POH$), tetraethylphosphonium hydroxide ($Et_4POH$), tetrabutylphosphonium hydroxide ($Bu_4POH$), benzyltrimethylphosphonium hydroxide ($Ph\text{-}CH_2(Me)_3POH$), hexadecyltrimethylphosphonium hydroxide, 2̂ basic salts such as tetramethylphosphonium borohydride ($Me_4PBH$), tetrabutylphosphonium borohydride ($Bu_4PBH$), tetrabutylphosphonium tetraphenyl borate ($Bu_4PBPh_4$), tetramethylphosphonium tetraphenyl borate ($Me_4PBPh_4$), and the like.

The above-mentioned basic nitrogen compound and/or basic phosphorus compound is preferably used at such a ratio that the basic nitrogen atom or basic phosphorus atom is $1\times10^{-5}$ to $5\times10^{-4}$ equivalent based is on 1 mol of the aromatic dihydroxy compound. A more preferable ratio of the amount of use is $2\times10^{-5}$ to $5\times10^{-4}$ equivalent based on the same basis. An especially preferable ratio of the amount of use is $5\times10^{-5}$ to $4\times10^{-4}$ equivalent based on the same basis.

In the method of the present invention, as the uncrystallized low molecular weight aromatic polycarbonate, an aromatic polycarbonate in a state of an oligomer or prepolymer having an intrinsic viscosity [η] of 0.05 to 0.38, preferably 0.10 to 0.32, more preferably 0.10 to 0.25 is used.

An intrinsic viscosity [η] of an aromatic polycarbonate in the present invention is the value calculated from a viscosity determined at a temperature of 20° C. in a dichloromethane solution.

When the intrinsic viscosity [η] of the low molecular weight aromatic polycarbonate used in the present invention is smaller than the above-mentioned range, it is difficult to prepare a crystallized product having a melting point sufficiently high for performing a solid-phase polymerization reaction, and further volatile components generated during the solid phase polymerization reaction is too large; and such an intrinsic viscosity is not preferred. On the other hand, it is not preferable that the intrinsic viscosity [η] exceeds the above-mentioned range, because too much time is needed for producing the low molecular weight aromatic polycarbonate, and coloring, gelation or the like sometimes occur.

The uncrystallized low molecular weight aromatic polycarbonate commonly has a completely amorphous state having a degree of crystallization of almost 0%, or in an amorphous state near to this. When the polycarbonate oligomer is produced by a melt polycondensation reaction, the polycarbonate oligomer exiting in a molten state of just after the reaction is preferably used.

In the first method of the present invention, when the low molecular weight polycarbonate shown above is crystallized, a monohydroxy compound or a mixture of this compound and water is used as a crystallization solvent, and the low molecular weight aromatic polycarbonate is brought into contact with the liquid or the vapor; thus the polycarbonate is crystallized.

Here, as the monohydroxy compound, an aliphatic alcohol such as methanol, ethanol, 1-propanol, 2-propanol, 1-butanol, 2-butanol or 2-methyl-2-butanol, an alicyclic alcohol such as cyclohexanol, or an aromatic alcohol such as phenol, benzyl alcohol, phenethyl alcohol, o-chlorophenol, m-chlorophenol, p-chlorophenol, o-cresol, m-cresol p-cresol 1-naphthol or 2-naphthol can be used Among them, methanol ethanol, 1-propanol, 2-propanol and phenol are preferable, and phenol is especially preferable.

These monohydroxy compounds can be used independently or in a mixture of plural compounds.

Independent use of the above-mentioned monohydroxy compound causes no trouble, but it is suitable to use it in a mixture with water in an industrial process. The content of the monohydroxy compound in the mixture is 1 wt. % or more, preferably in the range of 5 to 99 wt. % in terms of the monohydroxy compound. The mixture of a monohydroxy compound and water is not necessarily homogenous solution, but it may be in a state of a dispersion.

That is, in the present invention, the monohydroxy compound can be used independently, but when it is used in a mixture with water, the mixing ratio of both the components (mono hydroxy compound/water) is suitably 1/99 to 99.9/0.1, and the range of 5/95 to 99/1 by weight is preferable. When the ratio of water is larger than this range, unfavorably, the time needed for crystallization is too long, or a low molecular weight polycarbonate that has been sufficiently polymerized can not be obtained.

By their study, the inventors of the present invention found a peculiar effect that, in a mixture of phenol and water, due to the addition of water, the dissolution of the low molecular weight aromatic polycarbonate during the crystallization treatment is not only suppressed compared with the case of phenol alone, but also the crystallization is accelerated. This effect is especially significant in the range of 95/5 to 80/20 in terms of the weight ratio of phenol/water.

In the present invention, when the uncrystallized low molecular weight polycarbonate (oligomer or prepolymer) is produced by a melt polycondensation method, it is preferable that the monohydroxy compound formed by the reaction of a carbonate bond-forming compound to use in the production with an aromatic dihydroxy compound is identical to the monohydroxy compound to use for crystallization. This brings merits that the possibility of the contamination of impurities into the polycarbonate resin product is reduced, and the designing of the recovery system becomes easy.

For example, when an aromatic dihydroxy compound and diphenyl carbonate are subjected to a melt polycondensation reaction, phenol is generated during the reaction, and if phenol or a mixture of phenol and water is used as the crystallization solvent, there is a merit that the contamination of impurities into the polycarbonate product is little, and further, the recovery of the solvent is easy. In this case, as the phenol for crystallization, the phenol to be discharged from the melt polycondensation process can be used.

In the present invention, the method for bringing a low molecular weight aromatic polycarbonate into contact with a monohydroxy compound or a mixture of a monohydroxy compound and water is (I) a method that after a low molecular weight aromatic polycarbonate of a molten state is granulated, the granules are dipped in the above-mentioned mixture of a liquid state of a monohydroxy compound and water, (II) a method that after or while a low molecular weight aromatic polycarbonate of a molten state is dipped in the above-mentioned mixture of a liquid state of a monohydroxy compound and water, the polycarbonate is granulated, (III) a method that after a low molecular weight aromatic polycarbonate of a molten state is granulated, the granules are exposed to the vapor containing the above-mentioned mixture of a monohydroxy compound and water, (IV) a method that after a low molecular weight aromatic polycarbonate of a glass state is granulated, the granules are dipped in the above-mentioned mixture of a liquid state of a monohydroxy compound and water, (V) a method that after or while a low molecular weight aromatic polycarbonate of a glass state is dipped in the above-mentioned mixture of a liquid state of a monohydroxy compound and water, the polycarbonate is granulated, (VI) a method that after a low molecular weight aromatic polycarbonate of a glass state is granulated, the granules are exposed to the vapor containing the above-mentioned mixture of a monohydroxy compound and water, (VII) a method that while a low molecular weight aromatic polycarbonate of a molten state is granulated, the polycarbonate is converted into a glass state, and subsequently it is dipped in the above-mentioned mixture of a liquid state of a monohydroxy compound and water, (VIII) a method that while a low molecular weight aromatic polycarbonate of a molten state is granulated, the polycarbonate is converted into a glass state, and subsequently it is exposed to the vapor containing the above-mentioned mixture of a monohydroxy compound and water, or the like.

Examples of a preferable mode in the case of the above-mentioned (I) include a method that a low molecular weight aromatic polycarbonate of a molten state is granulated by dropping it or allowing it to adhere in a specified size onto a stainless plate intermittently, subsequently the polycarbonate is allowed to drop from the stainless plate into liquid flow of a mixed liquid containing the above-mentioned monohydroxy compound, and it is transported to a solid-liquid separator, a method that a low molecular weight aromatic polycarbonate is pulled out in the shape of a strand from a molten state, the strand-shaped polycarbonate is cut into a specified length and granulated by a cutter, a rotary blade or the like, subsequently it is allowed to drop into liquid flow of a mixed liquid containing the above-mentioned monohydroxy compound, the granulated particles are recovered, and they are transported to a solid-liquid separator by the liquid flow, and the like.

Examples of a preferable mode in the case of the above-mentioned (II) include a method that a low molecular weight polycarbonate of a molten state is extruded into a mixed solution containing the above-mentioned monohydroxy compound in the shape of a strand by a gear pump or the like, and subsequently the strand-shaped polycarbonate is cut by applying shearing force, that is, the strand-shaped polycarbonate is cut into a specified length and granulated by an in-liquid chip cutter, for example, a cutter, a rotary blade or the like whose blade is placed perpendicularly to a discharge opening.

Examples of a preferable mode in the case of the above-mentioned (III) include a method that a low molecular weight polycarbonate of a molten state is granulated by dropping it or allowing it to adhere in a specified size onto a stainless plate intermittently, and subsequently the granules on the stainless plate are transported through a space of a mixed vapor containing the above-mentioned monohydroxy compound on a belt conveyor, a method that polycarbonate is pulled out in the shape of a strand from a molten state, the strand-shaped polycarbonate is cut into a specified length and granulated by a cutter, a rotary blade or the like, and subsequently the granules are transported by a flow of the mixed vapor, a method that a polycarbonate is pulled out in a shape of a strand from a molten state, the strand-shaped polycarbonate is cut into a specified length and granulated by a cutter, a rotary blade or the like, and subsequently the granules are transported through a flow of the mixed vapor on a belt conveyor, and the like.

Examples of a preferable mode in the case of the above-mentioned (IV) include a method that a low molecular weight polycarbonate is pulled out in the shape of a strand from a molten state into water or hot water with the result that it is converted into a glass state, the strand-shaped polycarbonate is cut into a specified length and granulated by a cutter, a rotary blade or the like, subsequently the granulated polycarbonate is allowed to drop into liquid flow of a mixed solution containing the above-mentioned monohydroxy compound, the granulated particles are recovered, and they are transported to a solid-liquid separator by the liquid flow.

Examples of a preferable mode in the case of the above-mentioned (V) include a method that a low molecular weight polycarbonate after polymerization is discharged into water or hot water with the result that it is converted into a glass state, subsequently it is extruded in the shape of a strand into a mixed solution containing the above-mentioned monohydroxy compound, and the strand-shaped polycarbonate is cut into a specified length and granulated by a cutter, a rotary blade or the like whose blade is placed perpendicularly to the strand.

Examples of a preferable mode in the case of the above-mentioned (VI) include a method that a low molecular weight polycarbonate is pulled out in a shape of a strand from a molten state into water or hot water with the result that it is converted into a glass state, the strand-shaped polycarbonate is cut into a specified length and granulated by a cutter, a rotary blade or the like, and subsequently the granules are transported by mixed vapor flow containing a monohydroxy compound, a method that a low molecular weight polycarbonate is pulled out in a shape of a strand from a molten state into water or hot water with the result that it is converted into a glass state, the strand-shaped polycarbonate is cut into a specified length and granulated by a cutter, a rotary blade or the like, and subsequently the granules are transported through mixed vapor flow containing the above-mentioned monohydroxy compound on a belt conveyor, and the like.

Further, examples of a preferable mode in the case of the above-mentioned (VII) include a method that a low molecular weight polycarbonate of a molten state is granulated by dropping it or allowing it to adhere in a specified size onto a cooled stainless plate intermittently while it is converted into a glass state, subsequently the polycarbonate is allowed to drop from the stainless plate into liquid flow of a mixed solution containing the above-mentioned monohydroxy compound, and it is transport to a solid-liquid separator.

Furthermore, examples of a preferable mode in the case of the above-mentioned (VIII) include a method that a low molecular weight polycarbonate of a molten state is granulated by dropping it or allowing it to adhere in a specified size onto a cooled stainless plate intermittently while it is converted into a glass state, and subsequently the granules are transported by a mixed vapor flow containing the above-mentioned monohydroxy compound, a method that the polycarbonate of a molten state is granulated by dropping it or allowing it to adhere in a specified size onto a cooled stainless plate intermittently while it is converted into a glass state, and subsequently the granulates are transported through a mixed vapor flow containing the above-mentioned monohydroxy compound on a belt conveyor, and the like.

Although the amount of the monohydroxy compound or a mixture of the monohydroxy compound and water used in dipping an uncrystallized low molecular weight aromatic polycarbonate is not specifically limited it is preferably 0.5 to 60 times the uncrystallized low molecular weight aromatic polycarbonate by weight. When it is 0.5 time or less by weight, it is insufficient for the low molecular weight aromatic polycarbonate to be dipped, on the other hand, 50 times or more by weight is not preferred on the view point of process efficiency since larger amount of liquid must be handled.

The temperature of the monohydroxy compound or a mixture of the monohydroxy compound and water used in dipping an uncrystallized low molecular weight aromatic polycarbonate is not specifically limited, and it is preferably equal to or higher than the melting point and equal to or lower than the boiling point of the mixture of the monohydroxy compound and water. The time for dipping in the mixed liquid depends the kind, concentration and temperature of the monohydroxy compound; however, generally speaking, it is suitably about 5 seconds to 30 minutes.

On the other hand, the vapor containing the monohydroxy compound or a mixture of the monohydroxy compound and water used in the process of the present invention is not limited to a saturated vapor consisting only of the monohydroxy compound or the mixture of the monohydroxy compound and water, but a mixed vapor of an inert gas such as nitrogen, argon or helium, and a mixture of the monohydroxy compound and water can be used. The exposing time to the vapor containing the monohydroxy compound is suitably about 10 minutes to 10 hours.

Further, according to the second method of the present invention, 100 parts by weight of an uncrystallized low molecular weight aromatic polycarbonate having the main recurring unit expressed by the above-mentioned formula (1) and an intrinsic viscosity [η] of 0.05 to 0.38, and 0.1 to 25 parts by weight of an aromatic monohydroxy compound are melt mixed, and the obtained mixture is crystallized by holding it at a temperature equal to or higher than the glass transition temperature, and lower than the melting point of the mixture.

That is, to 100 parts by weight of the low molecular weight aromatic polycarbonate is added 0.1 to 25 parts by weight of an aromatic monohydroxy compound as a plasticizer, and the mixture is melt mixed under the following conditions.

Here, preferable examples of the aromatic monohydroxy compound include phenol, benzyl alcohol, phenethyl alcohol, o-chlorophenol, m-chlorophenol, p-chlorophenol, o-cresol, m-cresol, p-cresol, 1-naphthol, 2-naphthol and the like; Among them, phenol, benzyl alcohol, phenethyl alcohol, o-chlorophenol and m-chlorophenol are preferable, and phenol is especially preferable.

The low molecular weight aromatic polycarbonate and an aromatic monohydroxy compound are mixed at a temperature equal to or higher than the glass transition temperature (Tg) of the lower molecular weight aromatic polycarbonate. The melt-mixing temperature is commonly 160 to 250° C., preferably 180 to 220° C.

The method for melt mixing is not specifically limited, as far as a low molecular weight aromatic polycarbonate of a molten state and an aromatic monohydroxy compound can be homogeneously mixed. For example, an aromatic monohydroxy compound may be added to the product at a point when the polymerization reaction of the low molecular weight aromatic polycarbonate has been completed in a vertical type or horizontal type polymerization reactor and mixed, or an aromatic monohydroxy compound may be added in a liquid state to the product by a twin-screw extruder or the like using a plunger pump or the like and melt mixed.

In the present invention, as mentioned above, a low molecular weight aromatic polycarbonate of a substantially uncrystallized state and an aromatic monohydroxy compound are melt mixed homogeneously at a temperature equal to or higher than the glass transition temperature (Tg) of the low molecular weight aromatic polycarbonate, and subsequently the mixture is crystallized by holding it at a temperature ranging from the glass transition temperature (Tg) to a temperature not exceeding the melting point of the mixture. If the temperature is lower than the glass transition temperature (Tg) of the mixture, the crystallization hardly proceeds, and if it is equal to or higher than the melting point, crystals melt, and objects of the present invention are not achieved. A preferable temperature for the crystallization treatment is a temperature equal to or higher than "the glass transition temperature of the mixture +20° C.", and not exceeding the melting temperature of the mixture, more preferably a temperature equal to or higher than "the glass transition temperature of the mixture +40° C.", and equal to or lower than "the melting point −5° C."

For example, in the case where an aromatic monohydroxy compound is used as plasticizer for a polycarbonate made of 2,2-bis(4-hydroxyphenyl)propane and diphenyl carbonate, a temperature in the range of about 110 to 220° C., is preferred, although it depends the degree of polymerization.

In the present invention, an uncrystallized low molecular weight polycarbonate can be crystallized as mentioned above; however, 0.1 to 25 parts by weight of a crystallized granular aromatic polycarbonate (this is called "crystallized polycarbonate" in the present invention) having substantially identical structure can be added to 100 parts by weight of the low molecular weight polycarbonate and melt mixed at a temperature lower than the melting point of the crystallized aromatic polycarbonate, at need.

In the first method of the present invention, before an uncrystallized low molecular weight polycarbonate is brought into contact with a monohydroxy compound or a mixture of the compound and water, or in the second method, concurrently with the addition of an aromatic monohydroxy compound, the crystallized polycarbonate like this can be melt mixed with the uncrystallized low molecular weight polycarbonate. By this treatment, the crystallization of the uncrystallized low molecular weight polycarbonate can be accelerated.

Here, "substantially identical structure" means that the main recurrent units of the polymers are identical to each other, and that it is no mater to have some differences in the parts having substantially no relation to the main recurrent units, for example, the structures of the terminal groups, the constitution ratio of a terminal group such as hydroxyl group, the degree of branches generated by a side reaction or the like. There is no specific limitation in the intrinsic viscosity [η] of the crystallized aromatic polycarbonate, but it is preferably 0.15 to 1.7, more preferably 0.25 to 1.5.

As the above-mentioned crystallized aromatic polycarbonate, a polycarbonate produced by either of melt polycondensation or interfacial polymerization can be used; however, a crystallized product converted into a high molecular weight by solid phase polymerization shown bellow is suitably used.

The degree of crystallization of the above-mentioned crystallized aromatic polycarbonate is preferably about 10 to 70%. The degree of crystallization of the crystallized aromatic polycarbonate of less than 10% is insufficient in crystallization stimulation efficiency and not preferred; and a polycarbonate having a degree of crystallization of 70% or more is substantially difficult in production. The degree of crystallization of the crystallized aromatic polycarbonate is preferably 15 to 60%, and more preferably 20 to 55%.

The amount of addition of the above-mentioned crystallized aromatic polycarbonate is preferably 0.1 to 25 parts by weight, more preferably 0.5 to 20 parts by weight based on 100 parts by weight of the low molecular weight aromatic polycarbonate. When the amount of addition of the crystallized aromatic polycarbonate is smaller than the above-mentioned range, although depends the particle diameters, the crystallization stimulation effect is unfavorably small, and when it is larger than the range, the productivity is unfavorably low. The amount of addition of the crystallized aromatic polycarbonate is preferably 0.5 to 20 parts by weight, more preferably 1.0 to 15 parts by weight based on 100 parts by weight of the low molecular weight aromatic polycarbonate.

The low molecular weight aromatic polycarbonate and the crystallized aromatic polycarbonate are mixed at a temperature equal to or higher than the melting point of the low molecular weight aromatic polycarbonate and lower than the melting point of the crystallized aromatic polycarbonate. That is; in the state that the low molecular weight aromatic polycarbonate is in a molten state and the crystallized aromatic polycarbonate is in the solid state, they are mixed as homogeneously as possible. The melt-mixing temperature like this is selected commonly in the range of 160 to 250° C., preferably in the range of 180 to 220° C.

Since a polymer made from, for example, 2,2-bis(4-hydroxyphenyl)propane and diphenyl carbonate has a high melting point exceeding 220° C., the use of this polymer as the crystallized aromatic polycarbonate enables the widening of the choice of the above-mentioned melt-mixing temperature, and this is preferable also from the point of processability.

There is no special limitation on a method for melt mixing as far as it can mix a low molecular weight aromatic polycarbonate of a molten state and a powdery granular crystallized aromatic polycarbonate homogeneously. For example, granules of the crystallized aromatic polycarbonate may be mixed in a vertical or horizontal polymerization reactor on the time when the polymerization of the low molecular weight aromatic polycarbonate has been completed, or both the components may be melt mixed by a twin-screw extruder or the like.

There is no special limitation on the average particle diameter of the crystallized polycarbonate, however, the range of the average particle diameter is preferably from 0.1 to 500 $\mu$m, more preferably from about 0.5 to 100 $\mu$m, and it is preferable that the particle diameters distribute substantially in the range.

The melt-mixed product thus obtained is quickly crystallized by the treatment with the above-mentioned monohydroxy compound represented by phenol, but depending the degree of the progress of the crystallization, in some cases it is preferable to apply heating at a temperature equal to or higher than the crystallization temperature for the acceleration of crystallization. The additional heat treatment like this is carried out in the range where no re-fusion occurs between crystallized products themselves, and it is required that the crystallization proceeds to such an extent that they do not fuse at a solid phase polymerization temperature. In this case, depending the crystallization temperature, some increase in the degree of polymerization may occur.

The crystallized aromatic polycarbonate which has been crystallized and granulated by the method of the present invention shown above is treated for the removal and recovery of the crystallization solvent at need For this treatment, a solid-liquid separator such as a centrifugal separator, a hot air dryer or the like is commonly used. When the recovered matter contains water, a known separation means such as distillation or two-phase separation can be used for separating water. The monohydroxy compound used as the crystallization solvent in the present invention hardly causes cracks on polycarbonate granules, and there is less chance of affecting bad influences on the properties of the polymer and the subsequent solid phase polymerization process even in the case of the remaining of the compound in a minute amount in the polymer.

Further, when a compound identical to the monohydroxy compound generated in the melt polycondensation process is used as the monohydroxy compound, it is possible to integrate recovery processes for both the processes, and the recovery process can be rationalized. For example, when an aromatic dihydroxy compound and diphenyl carbonate are made to react in the melt polycondensation process, phenol is generated; and thereby, when phenol it self or a mixture of phenol and water is used in the crystallization process, the recovery processes for both the processes can be integrated. Further, it is possible to use the phenol generated in the melt polycondensation process in the crystallization process.

The low molecular weight polycarbonate crystallized, as shown above, by the method of the present invention can be subjected to solid phase polymerization by heating it as in a solid state at a temperature equal to or lower than the melting point of the crystallized product under reduced pressure or in an inert gas flow; thus, it is converted into an aromatic polycarbonate of high degree of polymerization.

The solid phase polymerization temperature is suitably about 180 to 350° C. Although a higher temperature is preferable from the point of polymerization speed, it is necessary to carry out solid phase polymerization at a temperature lower than the melting point of the crystallized product in order to prevent the fusion of the crystallized product. Further, since the melting point of the crystallized product increases with the increase of the degree of polymerization, the method in which the solid phase polymerization temperature is serially increased with the increase of the melting point is also preferable. The polymerization time is commonly several hours to several tens of hours.

Further, the inert gas to use is, for example, helium, argon or nitrogen gas, or the like. Regarding the degree of the reduced pressure under which the polymerization is carried out, the lower it is, the higher the polymerization efficiency is; however, the degree of the reduced pressure is about 1 Pa to 30 kPa, preferably about 5 Pa to 15 kPa, from the consideration of a practical range. During the solid phase polymerization, the crystallized product may be stirred mechanically or by gas flow.

The solid phase polymerization is preferably continued until the intrinsic viscosity [$\eta$] of the polymer reaches 0.3 to 1.7.

The polycarbonate resin produced by solid phase polymerization shown above is excellent in color tone, little in the content of gel component and excellent in formability; however, it can be treated, at need, for the blocking reaction of terminal hydroxy groups and the stabilization of melt viscosity, and it is preferable to apply these treatments in that they improve the molding thermal stability and the endurance stability of the polycarbonate resin.

The blocking of terminal hydroxyl groups of the polycarbonate resin can be carried out by using a polymer melt-mixing apparatus such as a twin-screw extruder on a polycarbonate resin whose polymerization has been completed; for example, according to a method described in U.S. Pat. No. 5,696,222, the terminal hydroxy groups can be blocked with a salicylic acid ester compound. In this case, the amount of use of the salicylic acid ester is preferably 0.8 to 10 mol. more preferably 0.8 to 5 mol, especially preferably 0.9 to 2 mol based on 1 chemical equivalent of the terminal hydroxyl group before the blocking reaction. By adding the blocking agent at this ratio, 80% or more of the terminal hydroxyl groups can be blocked suitably.

Regarding the stabilization of melt viscosity, a melt-viscosity stabilization method which has been used in melt polymerization is applicable; for example, a polycarbonate prepared by completing the solid phase polymerization is remelted, and a method disclosed by JP-A 7-165905 (JP-A means an unexamined Japanese patent publication) can be applied to the molten polymer.

As the melt-viscosity stabilizing agent, a sulfonic acid compound is suitable. The sulfonic acid compound can be (A) sulfonic acid phosphonium or ammonium salt or (B) sulfonic acid or a lower ester of sulfonic acid. The above (A) and (B) can be used in combination.

The polycarbonate resin produced by the present invention can be used in the conventional usage of a polycarbonate resin as a forming resin, a film or a fiber by compounding it with various additives such as a mold-releasing agent, a heat stabilizer, an ultraviolet absorbent, a coloring agent and an antistatic agent, an inorganic agent such as a glass fiber, a mineral or a filler, or a polymer other than a polycarbonate resin, depending application.

The present invention enables the effective crystallization of an uncrystallized low molecular weight aromatic polycarbonate without needing a complicated recovery system nor accompanying the generation of powder or the like by crystallizing the uncrystallized low molecular weight aromatic polycarbonate with a special solvent system. And, by subjecting the obtained crystallized product to solid phase polymerization, a high quality polycarbonate resin having a high degree of polymerization can be easily prepared. The resin has excellent color tone and formability, and it can give useful formed articles.

EXAMPLES

The present invention will be explained further in detail hereafter with examples; however, it is not restricted by the examples.

(1) Intrinsic Viscosity [η] of an Aromatic Polycarbonate

Determined at 20° C. in dichloromethane by an Ubbelohde viscometer.

(2) Glass Transition Temperature (Tg) and Melting Point

Glass transition temperature (Tg) and melting point were determined from a chart obtained through measurement at a temperature elevation speed of 20° C./min by using DSC 7 (manufactured by Parkinelmer Inc.). The enthalpy for crystal melting (ΔH) was calculated from the area of the part of the crystal melting of the chart.

(3) Degree of Crystallization

The degree of crystallization was calculated from the ΔH obtained by DSC measurement, letting the ΔH of 100% crystallized polycarbonate 109.8 J/g referring J. Polym. Sci.: B:Polym. Phys. 1511–1517, 25, 1979.

Reference Example 1

Example of Synthesis of Uncrystallized Low Molecular Weight Aromatic Polycarbonate Into a reactor provided with a stirrer, a pressure reducing apparatus, a distillation tower and others was charged 228 parts by weight of 2,2-bis(4-hydroxyphenyl)propane, 223 parts by weight of diphenyl carbonate, 0.009 part by weight of tetramethylammonium hydroxide and 0.00014 part by weight of biphenyl A disodium salt, and the mixture was dissolved by stirring for 30 minutes at 180° C. in nitrogen atmosphere. Subsequently, the pressure was gradually reduced concurrently with temperature elevation, and they were made to react while the generated phenol was being distilled off until the final state of 220° C. and 30 mmHg. The low molecular weight polycarbonate (oligomer) obtained on this point had an intrinsic viscosity [1] of 0.15, and a glass transition temperature (Tg) of 116° C.

Reference Example 2

Example of Synthesis of Crystallized Aromatic Polycarbonate

A part of the low molecular weight polycarbonate (oligomer) obtained in the above-mentioned Reference Example 1 was taken out, and it was heat-treated at 180° C. for 4 hours in nitrogen atmosphere. In a one-hour heat treatment, crystallization hardly proceeded, but a four-hour heat treatment gave a product having a degree of crystallization of 23%. The obtained crystallized product had an intrinsic viscosity [η] of 0.16, a melting point of 220° C., and a ΔH of 27.9 J/g. This was pulverized into a powdery product having particle diameters of 1 to 3 mm, and subsequently, the particles were subjected to a solid phase polymerization reaction at 210° C. for 2 hours in a nitrogen gas flow. By this reaction, the melting point became 226° C., and so the temperature was elevated to 220° C. and the reaction was continued for 5 hours. The obtained polymer had an intrinsic viscosity [η] of 0.3, a melting point of 258° C., and a ΔH of 37.9 J/g. This was pulverized into a powdery product having particle diameters of 100 μm or less.

Example 1

Five hundred parts by weight of the low molecular weight polycarbonate obtained in the above-mentioned Reference Example 1 was melt-extruded from a twin-screw extruder at 220° C., and the extruded product was dipped in a phenol bath heated at 60° C. for 10 minutes after cutting. After dipping, the phenol was removed by filtration, and the polymer was dried at 90° C. for 1 hour to obtain a crystallized product having particle diameters of 0.6 to 1.4 mm. The obtained crystallized product had an intrinsic viscosity [η] of 0.15, a melting point of 220.5° C., a ΔH of 16.3 J/g and a degree of crystallization of 20%, and the generation of fine particles was hardly detected in this process.

Example 2

The granular crystallized product obtained in the Example 1 was charged into a cylindrical reactor having a blowing port for an inert gas at the lower part, and the crystallized product was subjected to a solid phase polymerization reaction at 220° C. for 10.5 hours in a nitrogen gas flow at 0.8 NL/cm$^2$-min. The obtained polycarbonate had an intrinsic viscosity [η] of 0.40, a melting point of 281° C. and a ΔH of 63 J/g.

Example 3

By using a twin-screw extruder, 475 parts by weight of low molecular weight polycarbonate obtained in the above-mentioned Reference Example 1 and 25 parts by weight of the crystallized polycarbonate powder obtained in Reference Example 2 were melt mixed and then extruded at 220° C., and the extruded product was dipped in a phenol bath heated at 60° C. for 5 minutes after cutting. After dipping, the phenol was removed by filtration, and the polymer was dried at 90° C. for 1 hour to obtain a crystallized product having particle diameters of 0.6 to 1.4 mm. The obtained crystallized product was further heated at 180° C. for 1 hour to accelerate the crystallization. The crystallized product thus obtained has an intrinsic viscosity [η] of 0.25, a melting point of 240.2° C., a ΔH of 47.6 J/g and a degree of crystallization of 23%, and the generation of fine particles was hardly detected in this process.

By using the obtained polycarbonate, a solid phase polymerization was carried out at 220° C. for 10 hours in the same way as in Example 2 to prepare an aromatic polycarbonate resin having an intrinsic viscosity [η] of 0.43 and a melting point of 284° C.

Example 4

Five hundred parts by weight of the low molecular weight aromatic polycarbonate (oligomer) obtained in the above-mentioned Reference Example 1 was crushed and classified to obtain low molecular weight aromatic polycarbonate particles of an uncrystallized state having particle diameters of 2.8 to 4.7 mm. The particles were charged into an autoclave and exposed to a saturated vapor of a mixed solution of phenol/water=15/85 (volume ratio) at 115° C. for 6 hours to obtain a crystallized low molecular weight aromatic polycarbonate. The polycarbonate thus obtained had an intrinsic viscosity [η] of 0.15, a melting point of 222.3° C., and a degree of crystallization of 28%, and the generation of fine particles was not observed at all in this process.

Example 5

The granular crystallized product obtained in the Example 4 was charged into a cylindrical reactor having a blowing port for an inert gas at the lower part, and the crystallized product was subjected to a solid phase polymerization at 220° C. for 15 hours in a nitrogen gas flow at 0.8 NL/cm²-min and further at 230° C. for 10 hours. The obtained polycarbonate resin had an intrinsic viscosity [η] of 0.34 and a melting point of 268° C.

Example 6

By using a twin-screw extruder, 500 parts by weight of the low molecular weight aromatic polycarbonate (oligomer) obtained in the above-mentioned Reference Example 1 was melt mixed at 200° C., and subsequently the molten product was extruded into a mixed solution of phenol/water=8/2 (volume ratio) at 60° C. into strands. The strands were cut in the mixed solution, and subsequently dipped in the mixed solution for 30 seconds. After dipping, the mixed solution was removed by filtration, the solid was dried at 90° C. for 1 hour, at 120° C. for 30 minutes, at 150° C. for 30 minutes and further at 180° C. for 30 minutes to obtain a crystallized product. The product had particle diameters of 2.4 to 3.4 mm, an intrinsic viscosity [η] of 0.15, a melting point of 220.5° C. and a degree of crystallization of 26%.

Example 7

By using the crystallized low molecular weight aromatic polycarbonate, a solid phase polymerization was carried out at 220° C. for 15 hours in the same way as in Example 5 to prepare a polycarbonate resin having an intrinsic viscosity [η] of 0.33 and a melting point of 256° C.

This polycarbonate resin was remelted, to 500 parts by weight of this polymer was added 0.03 part by weight of dodecylbenzenesulfonic acid tetrabutylphosphonium salt, and they were pelletized after mixed for a specified time. The pellets could be excellently extrusion-molded Example 8

Into a 300 ml-glass container through which nitrogen gas can flow was charged 20 grams of the crystallized low molecular weight aromatic polycarbonate obtained in Example 6, the flow rate of the nitrogen gas was set at 4 L/minute, and solid phase polymerization was carried out serially at 150° C., 160° C., 180° C., 200° C. and 220° C. each for 1 hour, and at 240° C. for 18 hours. The obtained polycarbonate had an intrinsic viscosity [η] of 0.36 and a melting point of 276° C.

Example 9

By using a twin-screw extruder, 500 parts by weight of the low molecular weight aromatic polycarbonate (oligomer) obtained in the above-mentioned Reference Example 1 and 25 parts by weight of the powdery product having particle diameters of 100 μm or less obtained by crushing the crystallized polycarbonate resin after solid phase polymerization, which was obtained in the above-mentioned Example 7, were melt mixed and extruded at 220° C., and the extruded product was dipped in a mixed solution of phenol/water=8/2 (volume ratio) of 60° C. for 1 minute after cutting. After dipping, they were filtered to remove the mixed solution, the solid product was dried at 90° C. for 1 hour, at 120° C. for 30 minutes and further at 180° C. for 30 minutes to obtain a crystallized product. The product had particle diameters of 2.4 to 3.4 mm, an intrinsic viscosity [η] of 0.16, a melting point of 222° C. and a degree of crystallization of 25%.

By using the crystallized polycarbonate, solid phase polymerization was carried out in the same way as in Example 5 at 220° C. for 10 hours, at 230° C. for 10 hours and at 240° C. for 10 hours to prepare a polycarbonate resin having an intrinsic viscosity [η] of 0.36 and a melting point of 270° C.

Reference Example 3

Example of Synthesis of Crystallized Aromatic Polycarbonate

A part of the low molecular weight polycarbonate (oligomer) obtained in the above-mentioned Reference Example 1 was taken out, and it was heat-treated at 180° C. for 6 hours to obtain a crystallized product. The product had an intrinsic viscosity [η] of 0.16, a melting point of 223° C. and a degree of crystallization of 35%. This was crushed and classified to obtain particles having particle diameters of 1 to 3 mm, and subsequently they were made to react in a solid phase at 220° C. for 10 hours in nitrogen flow to obtain a crystallized aromatic polycarbonate. The crystallized aromatic polycarbonate had an intrinsic viscosity [η] of 0.32, a melting point of 262° C. and a degree of crystallization of 38%. This was crushed into powder having particle diameters of 100 μm or less.

Example 10

By using a twin-screw extruder, 500 parts by weight of the low molecular weight aromatic polycarbonate (oligomer) obtained in the above-mentioned Reference Example 1 and 25 parts by weight of the crystallized polycarbonate powder obtained in the above-mentioned Reference Example 3 were melt mixed and subsequently extruded at 220° C., and the extruded product was dipped in a mixed solution of phenol/water=8/2 (volume ratio) of 60° C. for 3 minutes after cutting. After dipping, they were filtered to remove the mixed solution, the solid product was dried at 90° C. for 30 minutes, at 150° C. for 30 minutes and further at 180° C. for 30 minutes to obtain a crystallized product The product had particle diameters of 2.4 to 3.5 mm, an intrinsic viscosity [η] of 0.16, a melting point of 221° C. and a degree of crystallization of 24%.

By using the crystallized polycarbonate, solid phase polymerization was carried out in the same way as in Example 5 at 220° C. for 10 hours, at 230° C. for 10 hours and further at 240° C. for 10 hours to prepare an aromatic polycarbonate resin having an intrinsic viscosity [η] of 0.34 and a melting point of 280° C.

Example 11

Except that the ratio was set at phenol/water=5/5 (weight ratio), the process was carried out in the same way as in Example 6. Thus, a crystallized oligomer having particle diameters of 2.0 to 4.0 mm, an intrinsic viscosity [η] of 0.15, a melting point of 221.1° C. and a degree of crystallization of 24% was obtained.

Reference Example 4

Example of Synthesis of Uncrystallized Low Molecular Weight Aromatic Polycarbonate Into a reactor provided with a stirrer, a pressure reducing apparatus, a distillation tower and the like was charged 228 parts by weight of 2,2-bis(4-hydroxyphenyl)propane, 223 parts by weight of diphenyl carbonate, 0.009 part by weight of tetramethylammonium hydroxide and 0.00014 part by weight of bisphenol A disodium salt, and they were dissolved by stirring for 30 minutes at 180° C. in nitrogen atmosphere. Subsequently, the pressure was lowered gradually, and they were made to react while distilling off the generated phenol and finally the pressure was brought to 100 mmHg at 180° C. At this point, the obtained low molecular weight aromatic polycarbonate (oligomer) had an intrinsic viscosity [η] of 0.06.

Example 12

Five hundred parts by weight of the low molecular weight aromatic polycarbonate (oligomer) obtained in the above-mentioned Reference Example 4 was crushed and classified to obtain low molecular weight aromatic polycarbonate particles of an uncrystallized state having particle diameters of 2.8 to 4.7 mm. The particles were dipped in methanol for 30 minutes, subsequently the methanol was removed by suction filtration, and the particles were air dried. The crystallized low molecular weight aromatic polycarbonate thus obtained had an intrinsic viscosity [η] of 0.06, a melting point of 159° C. and a degree of crystallization of 11%, and the generation of fine particles was not observed at all in this process.

Examples 13

The low molecular weight polycarbonate (oligomer) obtained in the above-mentioned Reference Example 1 was introduced into a twin-screw extruder. The temperature of the twin-screw extruder was set at 240° C. and the extrusion flow rate was set at 6 g/ml. On the exit side of the twin-screw extruder, a strand die and an in-liquid chip cutter were placed. The aperture of the strand die was 2 mm. As the liquid for the in-liquid chip cutter, phenol was used. The temperature of the phenol was set at 60° C. The oligomer of a molten state extruded from the strand die was cut by the in-liquid chip cutter into chips. The shapes of the chips of the oligomer obtained by cutting using the in-liquid chip cutter were cylinders of 2 mm in diameter and 2 mm in length, and they were homogeneous. After dipped for 5 minutes in the liquid of phenol used for the in-liquid chip cutter, the chips were taken out from the liquid, and dried at 90° C. for 60 minutes. The oligomer obtained after drying had a crystallized state, and this crystallized product had an intrinsic viscosity [η] of 0.15 and a degree of crystallization of 20%.

The granular crystallized product obtained above was charged into a cylindrical reactor having a blowing port for an inert gas at the lower part, and it was subjected to a solid phase polymerization at 220° C. for 10.5 hours in a nitrogen gas flow at 4 NL/min. The obtained polycarbonate had an intrinsic viscosity [η] of 0.40.

The generation of fine particles was not observed in the above processes.

Reference Example 5

Similarly, 500 parts by weight of the low molecular weight polycarbonate obtained in Reference Example 1 was introduced into an extruder, the obtained strands were cut into chips by an in-liquid chip cutter, and the chips were crystallized. As the liquid for the in-liquid chip cutter, the mixed solution recovered by condensing and liquefying the diphenyl carbonate and phenol generated as byproducts in the synthetic reaction of said low molecular weight aromatic polycarbonate was used. The temperature of the mixed solution was set at 60° C. The concentration of the phenol in the mixed solution of diphenyl carbonate and phenol was 91 wt. %. The shapes of the chips of oligomer prepared by cutting with the in-liquid chip cutter were cylinders of 2 mm in diameter and 2 mm in length, and the obtained chips were homogeneous. The chips were dipped for 5 minutes in the mixed liquid of diphenyl carbonate and phenol used for the in-liquid chip cutter, and subsequently they were taken out from the liquid and dried at 120° C. for 60 minutes. The oligomer after drying had a crystallized state, and the obtained crystallized product had an intrinsic viscosity [η] of 0.15 and a degree of crystallization of 22%. The granular crystallized product thus obtained was charged into a cylindrical reactor having a blowing port for an inert gas at the lower part, and subjected to a solid phase polymerization reaction at 220° C. for 10 hours in a nitrogen gas flow at a flow rate of 4 NL/min. The obtained polycarbonate had an intrinsic viscosity [η] of 0.43.

The generation of fine particles was not observed in the above processes.

Example 15

To 475 parts by weight of the low molecular weight polycarbonate obtained in the above-mentioned Reference Example 1 was added 25 parts by weight of phenol, the mixture was melt extruded from a twin-screw extruder at 220° C., the extruded matter was taken out on a hot plate of 180° C., and it was held there for 20 minutes for crystallization, and a crystallized product having particle diameters of 0.6 to 1.4 mm was obtained. The obtained crystallized product had an intrinsic viscosity [η] of 0.10, a melting point of 200.5° C. and a ΔH of 18.5 J/g.

Example 16

The granular crystallized product obtained in Example 15 was charged into a cylindrical reactor having a blowing port for an inert gas at the lower, and a solid phase polymerization reaction was carried out in a nitrogen gas flow at 0.8 NL/cm$^2$-min at 180° C. for 2 hours, subsequently for 4.5 hours after temperature elevation to 220° C., and further at 230° C. for 15 hours. The obtained polycarbonate had an intrinsic viscosity [η] of 0.36, a melting point of 279° C. and a ΔH of 57 J/g.

Reference Example 6

Five hundred parts by weight of the low molecular weight polycarbonate obtained in the above-mentioned Reference Example 1 was mixed with 25 parts by weight of diphenyl carbonate, the mixture was melt extruded from a twin-screw extruder at 220° C., the extruded matter was taken out on a hot plate of 165° C., it was held there for 20 minutes for crystallization, and a crystallized product having particle diameters of 0.6 to 1.4 mm was obtained. The obtained crystallized product had an intrinsic viscosity [η] of 0.15, a melting point of 216° C., a ΔH of 25 J/g and a degree of crystallization of 30%.

The polycarbonate was charged into a polymerization apparatus provided with a stirrer and a vacuum distillation system, and a solid phase polymerization reaction was carried out under a reduced pressure of 0.15 mmHg while slowly stirring at 180° C. for 2 hours, subsequently for 5 hours after temperature elevation to 220° C., and further for 15 hours at 230° C. The polycarbonate thus obtained had an intrinsic viscosity [η] of 0.36, a melting point of 273° C. and a ΔH of 45 J/g.

Reference Example 7

A mixture consisting of 500 parts by weight of the low molecular weight polycarbonate obtained in the above-mentioned Reference Example 1, 25 parts by weight of diphenyl polycarbonate and 25 parts by weight of the crystallized polycarbonate obtained in Reference Example 2 was melt extruded from a twin-screw extruder at 220° C., the extruded matter was taken out on a hot plate of 165° C., it was held there for 15 minutes for crystallization, and a crystallized product having particle diameters of 0.6 to 1.4 mm was obtained. The obtained crystallized product had an intrinsic viscosity [η] of 0.14, a melting point of 219.4° C., a ΔH of 22.8 J/g and a degree of crystallization of 29%.

By using the polycarbonate, solid phase polymerization was carried out in the same way as in Example 2, resulting in the preparation of an aromatic polycarbonate resin having an intrinsic viscosity [η] of 0.42 and a melting point of 269° C.

Comparative Example 1

Five hundred parts by weight of the low molecular weight polycarbonate obtained in the above-mentioned Reference Example 1 was dipped in 2000 parts by weight of acetone for 30 minutes under stirring, and it was dried at 120° C. for 2 hours after the acetone was removed by suction filtration. The obtained crystallized product had an intrinsic viscosity [η] of 0.15, a melting point of 220° C., a ΔH of 20 J/g and a degree of crystallization of 22%. In the crystallization process, 150 parts by weight of fine powder of 600 μm or less was generated.

What is claimed is:

1. A method for crystallizing a low molecular weight aromatic polycarbonate characterized in that an uncrystallized low molecular weight aromatic polycarbonate whose main recurrent unit is expressed by the following formula (1),

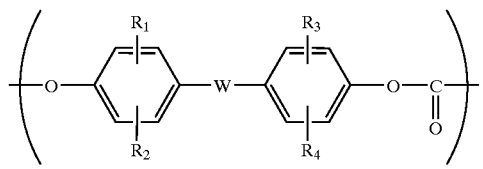

(1)

[in the formula (1), $R_1$, $R_2$, $R_3$ and $R_4$ are each independently a hydrogen atom, a halogen atom, a $C_{1-10}$ alkyl group, a $C_{7-20}$ aralkyl group or a $C_{6-20}$ aryl group; W is a $C_{2-10}$ alkylidene group, a $C_{1-15}$ alkylene group, a $C_{7-20}$ aryl-substituted alkylene group, a $C_{3-15}$ cycloalkylidene group, a $C_{3-15}$ cycloalkylene group, an oxygen atom, a sulfur atom, a sulfoxide group or a sulfone group], and which has an intrinsic viscosity [η] of 0.05 to 0.38 crystallized by bringing it into contact with a monohydroxy compound or a mixture of said compound and water.

2. A method for crystallizing a low molecular weight polycarbonate described in claim 1 characterized in that the low molecular weight aromatic polycarbonate is obtained by the melt polycondensation of an aromatic dihydroxy compound and a carbonate bond-forming compound.

3. A method for crystallizing a low molecular weight polycarbonate described in claim 2 characterized in that the low molecular weight aromatic polycarbonate is obtained by the melt polycondensation of an aromatic dihydroxy compound expressed by the following formula (2)

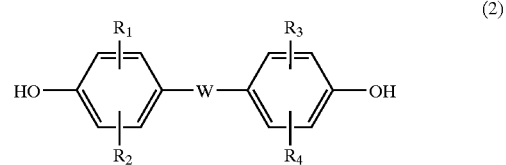

(2)

[in the formula (2), $R_1$, $R_2$, $R_3$, $R_4$ and W are same as those shown in the above-mentioned formula (1)] and a diphenyl carbonate.

4. A method for crystallizing a low molecular weight aromatic polycarbonate described in any one claims 1 to 3 characterized in that 0.1 to 25 parts by weight of a crystallized polycarbonate powdery granules is added to 100 parts by weight of an uncrystallized low molecular weight polycarbonate having an intrinsic viscosity [η] of 0.05 to 0.38, they are mixed at a temperature equal to or higher than the melting point of the uncrystallized low molecular weight polycarbonate and lower than the melting point of the crystallized polycarbonate, and the mixture thus treated is brought into contact with a monohydroxy compound or a mixture of said compound and water to crystallize the mixture.

5. A method for crystallizing a low molecular weight aromatic polycarbonate described in any one claims 1 to 4 characterized in that the monohydroxy compound is phenol.

6. A method for crystallizing a low molecular weight aromatic polycarbonate described in claim 5 characterized in that the low molecular weight polycarbonate is dipped in an aqueous solution or an aqueous dispersion containing phenol in an amount of 5 wt. % or more.

7. A method for crystallizing a low molecular weight aromatic polycarbonate described in claim 5 characterized in that the low molecular weight aromatic polycarbonate is brought into contact with a vapor containing phenol.

8. A method for crystallizing a low molecular weight aromatic polycarbonate characterized in that 100 parts by weight of an uncrystallized low molecular weight aromatic polycarbonate whose main recurrent unit is expressed by the following formula (1),

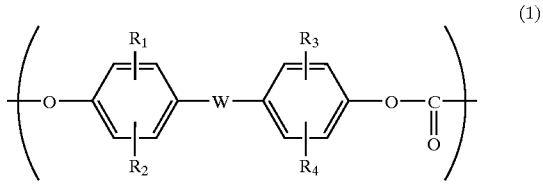

(1)

[in the formula (1), $R_1$, $R_2$, $R_3$ and $R_4$ are each independently a hydrogen atom, a halogen atom, a $C_{1-10}$ alkyl group, a $C_{7-20}$ aralkyl group or a $C_{6-20}$ aryl group; W is a $C_{2-10}$ alkylidene group, a $C_{1-15}$ alkylene group, a $C_{7-20}$ aryl-substituted alkylene group, a $C_{3-15}$ cycloalkylidene group, a $C_{3-15}$ cycloalkylene group, an oxygen atom, a sulfur atom, a sulfoxide group or a sulfone group], and which has an intrinsic viscosity [η] of 0.05 to 0.38, and 0.1 to 25 parts by weight of at least one or more kinds of compound selected from the group consisting of aromatic monohydroxy compounds, carbonic acid diester compounds and aromatic dihydroxy compounds are melt mixed, and the obtained mixture is crystallized by holding it at a temperature equal to or higher than the glass transition temperature, and lower than the melting point of the mixture.

9. A method for crystallizing a low molecular weight polycarbonate described in claim 8 characterized in that the low molecular weight aromatic polycarbonate is a product obtained by melt polycondensation of an aromatic dihydroxy compound and a carbonate to bond-forming compound.

10. A method for crystallizing a low molecular weight aromatic polycarbonate described in claim 8 or 9 characterized in that the aromatic monohydroxy compound is phenol.

11. A method for crystallizing a low molecular weight aromatic polycarbonate described in claim 8 characterized in that 0.1 to 25 parts by weight of powdery granules of a crystallized polycarbonate is further added to 100 parts by weight of the uncrystallized low molecular weight aromatic polycarbonate.

12. A method for a producing a polycarbonate resin characterized in that a crystallized product obtained by crystallizing the low molecular weight aromatic polycarbonate using the method described in either claim 1 or claim 8 is heated at a temperature lower than the melting point of the crystallized product under reduced pressure or in an inert gas flow to convert the polycarbonate into a high polymerized stated.

13. A method for producing a polycarbonate resin described in claim 12 characterized in that a polycarbonate having an intrinsic viscosity of 0.3 to 1.7 is produced by a heat treatment in an inert gas flow.

* * * * *